US008571899B1

United States Patent
Cochran et al.

(10) Patent No.: US 8,571,899 B1
(45) Date of Patent: Oct. 29, 2013

(54) APPARATUS AND METHOD FOR FUNDING AND OPERATING A MUNICIPAL FINANCIAL GUARANTY MUTUAL INSURANCE COMPANY

(75) Inventors: Robert Phillips Cochran, New York, NY (US); Sean Wallace McCarthy, New York, NY (US)

(73) Assignee: HG Global Ltd., Hamilton HM (BM)

( * ) Notice: Subject to any disclaimer, the term of this patent is extended or adjusted under 35 U.S.C. 154(b) by 0 days.

(21) Appl. No.: 13/554,935

(22) Filed: Jul. 20, 2012

(51) Int. Cl.
*G06Q 30/00* (2012.01)

(52) U.S. Cl.
USPC .............................................................. 705/4

(58) Field of Classification Search
USPC .............................................................. 705/4
See application file for complete search history.

(56) References Cited

U.S. PATENT DOCUMENTS

| | | | | |
|---|---|---|---|---|
| 2006/0282295 | A1* | 12/2006 | McComb et al. ................. | 705/4 |
| 2010/0223072 | A1* | 9/2010 | Jacobson ........................... | 705/3 |
| 2011/0238452 | A1* | 9/2011 | Ziade et al. ....................... | 705/4 |

OTHER PUBLICATIONS

Wiki staff/user; Mutual Insrance; Nov. 23, 2011, Wikipedia, web, 1-5.*
NLC, "Preliminary Business Plan, National League of Cities' Issuers Mutual Bond Assurance Company", May 1, 2009.*
Business Wire, Press Release: "Municipal and Infrastructure Assurance Corporation Approved for National Licensing Pilot Program", Feb. 24, 2009, 2 pgs. Downloaded at: http://www.reuters.com/article/2009/02/24/idUS163924+24-Feb-2009+BW20090224.
Herman et al., "MIAC Gets N.Y.'s OK to Become Guarantor", The Bond Buyer, The Daily Newspaper of Public Finance, Oct. 22, 2008, 3 pgs. Downloaded at: http://www.bondbuyer.com/issues/117_202/-295668-1.html.
NACA, The Journal of County Administration, Jan./Feb. 2011 issued, 12 pgs. Downloaded at: icma.org/Documents/Document/Document/302475.
Podkul, "Macquarie-backed Monoline Insurer Fast-Tracked for License", PEI Infrastructure Investor, Feb. 25, 2009, 2 pgs.

* cited by examiner

*Primary Examiner* — Eric T Wong
(74) *Attorney, Agent, or Firm* — Cooley LLP

(57) ABSTRACT

A computer includes a processor and a memory storing data and executable instructions to operate a municipal financial guaranty mutual insurance company. The processor processes the data and executable instructions to track insurance premiums paid by members of the municipal financial guaranty mutual insurance company, monitor private investment capital into a holding firm, follow the investment of a first subset of the private investment capital of the holding firm into the municipal financial guaranty mutual insurance company in exchange for first promissory notes, track a second subset of the private investment capital of the holding firm into a reinsurance firm, follow the investment of a segment of the second subset of the private investment capital of the reinsurance firm into the municipal financial guaranty mutual insurance company in exchange for second promissory notes, and manage reinsurance firm first loss claims from the municipal financial guaranty mutual insurance company.

5 Claims, 2 Drawing Sheets

US 8,571,899 B1

APPARATUS AND METHOD FOR FUNDING AND OPERATING A MUNICIPAL FINANCIAL GUARANTY MUTUAL INSURANCE COMPANY

FIELD OF THE INVENTION

This invention relates generally to computer implemented control of a business entity. More particularly, this invention discloses techniques for funding and operating a municipal financial guaranty mutual insurance company.

BACKGROUND OF THE INVENTION

The online encyclopedia Wikipedia (http://en.wikipedia.org/wiki/Mutual_insurance) characterizes a mutual insurance company as an insurance company that has no shareholders. Instead, the company is owned entirely by its policyholders. Consequently, profits are rebated to the policyholders in the form of dividend distributions or reduced future premiums. The idea of owning a portion of a company may be more attractive to some potential clients than the idea of being a source of profits for investors. This ownership either extends to all its policyholders or is restricted to certain classes of policyholders. Ownership rights typically include voting rights, for instance in the election of the board of directors. In a mutual insurance company, any distributed surplus funds are paid entirely to policyholders, whereas in a proprietary or stock company (one with shareholders) a proportion of the surplus is paid to shareholders, while the balance is held in reserve by the insurer.

Currently in the U.S. there is a strong need to develop civic infrastructure (e.g., roads, bridges, sewers, and the like). Unfortunately, municipalities are experiencing declining revenues so investment in civic infrastructure is difficult to accomplish. Civic infrastructure projects are commonly funded by bonds. A bond issuer collects money from investors and promises to pay back the money with an interest premium. The repaid money is typically derived from revenues associated with the investment project (e.g., tolls collected on a newly constructed road or bridge). Bond issuers typically desire some type of bond insurance to insure an investor against default. Such insurance provides a higher financial strength rating for investors, which provides more access to investors who value the credit enhancement, selection process and oversight that the financial guarantor provides. Such insurance is difficult to secure today because previous bond insurers were hard hit by excessive exposure to the U.S. housing sector.

In view of the foregoing, it would be desirable to provide new mechanisms to foster investment in civic infrastructure. More particularly, it would be desirable to provide new mechanisms for funding and operating a municipal financial guaranty mutual insurance company.

SUMMARY OF THE INVENTION

A computer includes a processor and a memory storing data and executable instructions to operate a municipal financial guaranty mutual insurance company. The processor processes the data and executable instructions to track insurance premiums paid by members of the municipal financial guaranty mutual insurance company, monitor private investment capital into a holding firm, follow the investment of a first subset of the private investment capital of the holding firm into the municipal financial guaranty mutual insurance company in exchange for first promissory notes, track a second subset of the private investment capital of the holding firm into a reinsurance firm, follow the investment of a segment of the second subset of the private investment capital of the reinsurance firm into the municipal financial guaranty mutual insurance company in exchange for second promissory notes, and manage reinsurance firm first loss claims from the municipal financial guaranty mutual insurance company.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
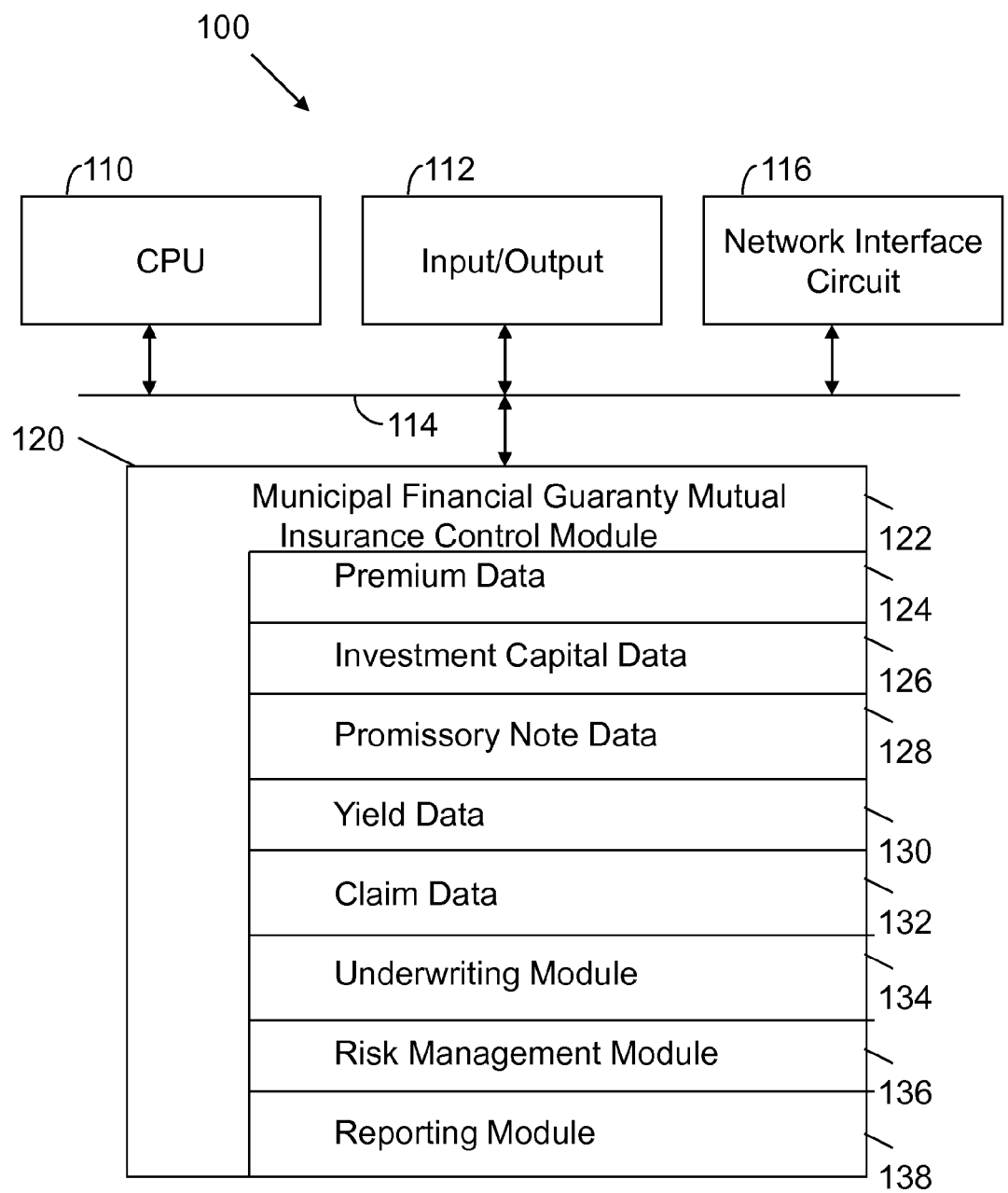
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 connected to a set of input/output devices 112 via a bus 114. The input/output devices 112 may include a keyboard, mouse, display, printer and the like. A network interface circuit 116 is also connected to the bus. The network interface circuit 116 allows the computer 100 to operate in a networked environment.

A memory 120 is also connected to the bus 114. The memory 120 stores executable instructions in the form of a municipal financial guaranty mutual insurance control module 122. In one embodiment, the module 122 operates on premium data 124. The premium data 124 is data on insurance premiums paid by insurance policy holders. The premium data 124 may also include member surplus payments, as discussed below. The insurance premiums are paid by bond issuers, which hold insurance policies on behalf of their investors.

Investment capital data 126 is also maintained and processed. The investment capital data details investments made by investors. The investor capital is a separate capitalization source that allows the municipal financial guaranty mutual insurance company to initiate business operations. In one embodiment, the investment capital is from private investors. In other embodiments, the investment capital is from public investors (e.g., government entities) or a combination of public and private investors.

Promissory note data 128 is also maintained and processed. The promissory note data 128 details pledges to repay invested capital along with some incremental premium. Yield data 130 is also maintained and processed. The yield data is the investment return to members of the municipal financial guaranty mutual insurance company. Yield data also includes the investment return to investors.

Claim data 132 is also maintained and processed. The claim data 132 details default claims of a policy holder. That is, if a bond issuer defaults on repayment of a coupon a claim is made so that the insured payment is still paid to the bond holder.

The underwriting module 134 includes executable instructions defining underwriting policies associated with the municipal financial guaranty mutual insurance company. Similarly, the risk management module 136 includes executable instructions defining appropriate risk controls (e.g., the financial health of the bond issuer, appropriate utilization of received funds, etc.)

A reporting module 138 includes executable instructions to generate reports for insured members of the mutual company, investors and financial regulatory bodies. The data and modules of the municipal financial guaranty mutual insurance control module 122 are exemplary. Various data and processing modules may be used in accordance with embodiments of the invention. Furthermore, the data and modules may be distributed among a variety of computers in a networked environment. It is the operations of the invention that are noteworthy, not the particular implementation details.

Figure 2:
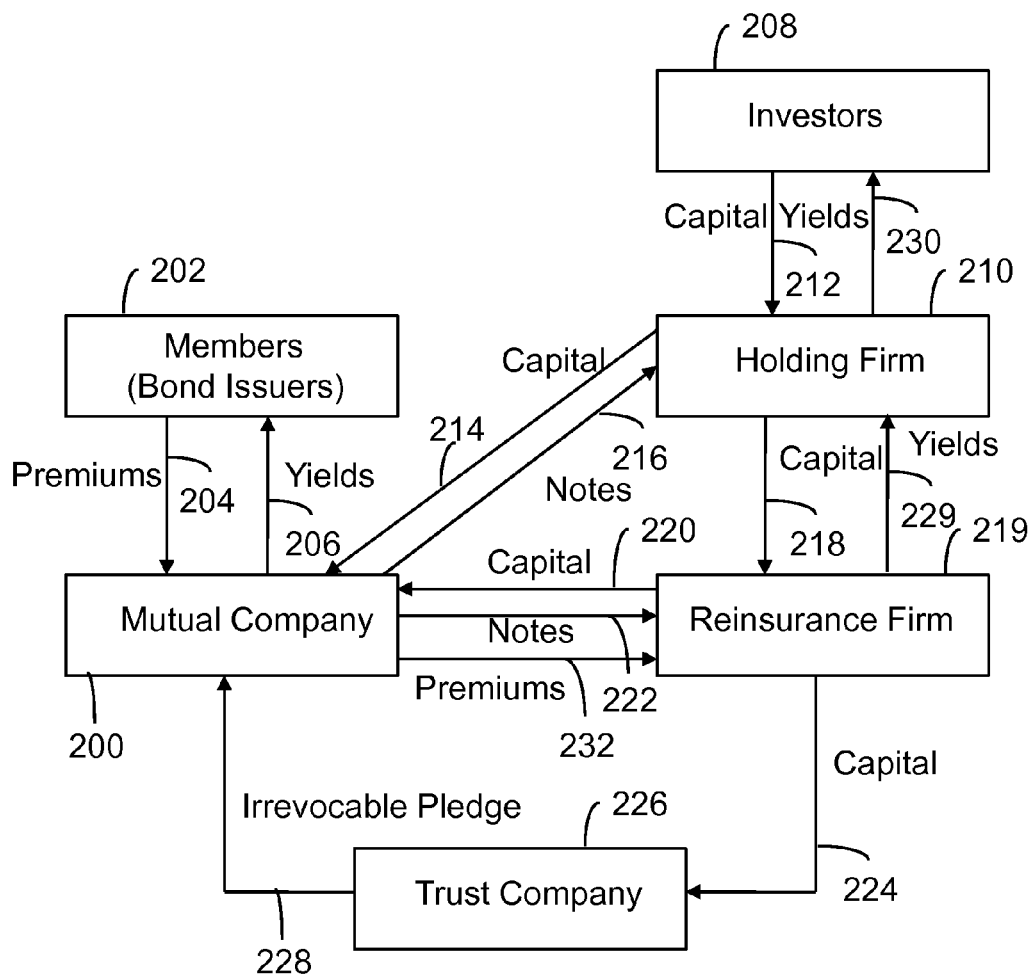
FIG. 2 illustrates processing operations associated with an embodiment of the invention.

FIG. 2 illustrates processing operations associated with an embodiment of the invention. A municipal financial guaranty mutual insurance company or mutual company 200 has members 202. The members 202 are bond issuers. The mutual company 200 is a direct guarantor of principal and interest, when due, on debt obligations issued by state and local municipal governments and public authorities. The issuers of municipal bonds insured by the mutual company 200 become mutual members. In particular, when an issuer 202 purchases a new issue municipal bond insurance policy from the mutual company 200 it becomes a member of the mutual company 200. In one embodiment, the mutual company 200 collects premiums 204. The premiums may be in the form of a member surplus contribution (e.g., 1% of the par amount of the insured bonds) and a standard insurance premium or risk premium. The amount of the risk premium is a function of the creditworthiness of the member.

In one embodiment the mutual company 200 only insures investment grade, essential public purpose municipal bonds that meet strict underwriting and single risk criteria set forth in the underwriting module 134. The mutual company 200 will periodically supply dividends or yields 206 to members 202 in accordance with pre-determined criteria.

The initial capitalization of the mutual company 200 is unique. The members 202 do not provide the initial capitalization. Rather, investors 208 provide initial capital 212. The investors may be private investors, public investors or a combination thereof.

In one embodiment, the private capital (e.g., $600M) is directed toward a holding firm 210. A first subset of the capital (e.g., $200M) 214 is paid to the mutual company 200 in exchange for promissory notes 216. The promissory notes constitute a promise to repay the capital at a specified interest rate over a specified period of time.

The holding firm invests a second subset of the capital (e.g., $400M) 218 in a reinsurance firm 219. The reinsurance firm 219 provides a subset of the capital (e.g., $300M) 220 to the mutual company in exchange for promissory notes 222.

In one embodiment, the reinsurance firm 219 then supplies capital (e.g., $100M in cash and $300M in promissory notes) 224 to a trust company 226. The trust company uses the capital to provide an irrevocable pledge 228 to fund first loss claims due from the reinsurance firm to the mutual company 200. Thus, the trust company provides collateralization for first loss reinsurance. For example, the reinsurance firm 219 may reinsure the first losses incurred under each policy up to 15% of the par amount outstanding under each policy.

In one embodiment, the mutual company 200 pays a portion of received risk premiums to the reinsurance firm 219 for assuming the first loss risk. As the notes 222 are paid off, the proceeds of redemption may be retained by the trust company.

In the foregoing example, mutual company 500 is capitalized with $500M in cash provided by the sale of Series A Surplus Notes ($200M) 216 purchased by the holding firm 210 and Series B Surplus Notes ($300M) 222 purchased by the reinsurance firm 219 and held in the trust company 226. In one embodiment, the Surplus Notes have a term of thirty years, will not amortize and will bear interest at a rate of 8% per annum. When an Issuer purchases a municipal bond insurance policy from the mutual company 200 and becomes a member of the mutual company, the mutual company collects a member surplus contribution. As the surplus of the mutual company 200 grows from member surplus contributions, portfolio investment earnings and earned premiums, the mutual company will periodically redeem the Surplus Notes. In one embodiment, the Series A Surplus Notes are redeemed first and then the Series B Surplus Notes are redeemed and the mutual company 200 capital is 100% funded by members 202.

In one embodiment, members 202 have an interest in the mutual company 200 proportional to the par insured of their outstanding bonds and are eligible for dividends from distributable surplus. A member will continue to be eligible for dividends as long as its policies remain in force and are not in default. In the event of an early refunding of insured municipal bonds, the member has the option to purchase mutual company insurance on the refunding bonds within the term of the original bonds without paying a new member surplus contribution. The member is eligible to receive dividends as long as the refunding policy remains in force.

The mutual company 200 has employees to administer insurance operations. Consequently, the holding firm 210, reinsurance firm 219 and trust company 226 may reduce or eliminate ongoing operational expenses associated with employees. As previously indicated, the mutual company 200 splits insurance premiums and/or member surplus payments with the reinsurance firm 219 and/or the holding firm 210, as shown with arrow 232. Such income divisions may be negotiated between the parties and may change over time.

Thus, the mutual company 200 constitutes a unique public/private partnership that lowers the cost of borrowing for the financing of essential public infrastructure. The mutual company 200 increases liquidity in the secondary market by promoting financial transparency. It insures investment grade, essential public purpose municipal bonds meeting strict underwriting criteria and maintains pricing discipline.

Owned by the municipalities that it insures, the mutual company 200 provides a stable source of bond insurance to the market without relying on the equity markets as a source of ongoing capital and without pressure to grow earnings and increase risk. The public/private partnership structure gives participating municipalities and secondary market investors a stake in the mutual company's long-term operations and financial results and provides private capital and market discipline to protect their interests through first-dollar reinsurance.

The operations of FIG. 2 are tracked by the computer 100 of FIG. 1. The premium data 124 of FIG. 1 corresponds to the premiums 204 paid by the members 202 to the mutual company 200. The investment capital data 126 of FIG. 1 corresponds to the capital 212 from investors 208. The promissory note data 128 corresponds to the notes 216 and 222. The yield data 130 corresponds to the yields 206 paid by the mutual company 200 to the members 202 and the yields 230 paid by the holding firm 210 to the investors 208. Yields 230 originate through yields 229 from the reinsurance firm 219. The yields 229 are derived from the interest payments on the notes 222 and premiums 232. Claim data 132 corresponds to claims resulting in first lost reinsurance payments by the trust company 226.

The underwriting module 134 includes executable instructions defining underwriting policies associated with the municipal financial guaranty mutual insurance company. Similarly, the risk management module 136 includes executable instructions defining appropriate risk controls (e.g., the financial health of the bond issuer, appropriate utilization of received funds, etc.) The reporting module 138 includes executable instructions to generate reports for insured members of the mutual company, investors and financial regulatory bodies.

While the invention has been disclosed in the context of a municipal financial guaranty mutual insurance company, it should be appreciated that the concepts of the invention may be applied to any structured product financial guarantee. In particular, the concepts of the invention are useful for establishing any ratings sensitive insurance venture that requires a large amount of capital to get started and that would otherwise not earn a satisfactory return for private capital.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer, comprising:
   a processor; and
   a memory storing data and executable instructions to operate a mutual insurance company, wherein the processor processes the data and executable instructions to:
   track insurance premiums paid by members of the mutual insurance company,
   monitor private investment capital into a holding firm;
   follow the investment of a first subset of the private investment capital of the holding firm into the mutual insurance company in exchange for first promissory notes,
   track a second subset of the private investment capital of the holding firm into a reinsurance firm,
   follow the investment of a segment of the second subset of the private investment capital of the reinsurance firm into the mutual insurance company in exchange for second promissory notes, and
   manage reinsurance firm first loss claims from the mutual insurance company.

2. The computer of claim 1 wherein the processor processes the data and executable instructions to manage the reinsurance firm first loss claims through a collateralized trust.

3. The computer of claim 1 wherein the processor processes the data and executable instructions to track a split of insurance premiums between the mutual insurance company and the reinsurance firm.

4. The computer of claim 1 wherein the processor processes the data and executable instructions to track a split of member surplus payments between the mutual insurance company and the reinsurance firm.

5. The computer of claim 1 wherein the mutual insurance company underwrites civic infrastructure projects.

* * * * *